United States Patent [19]

Hintz

[11] Patent Number: 5,679,429

[45] Date of Patent: *Oct. 21, 1997

[54] DUAL LAYER OPTICAL MEDIUM HAVING PARTIALLY REFLECTING THIN FILM LAYER

[75] Inventor: Michael B. Hintz, Mahtomedi, Minn.

[73] Assignee: Imation Corp., St. Paul, Minn.

[ * ] Notice: The term of this patent shall not extend beyond the expiration date of Pat. No. 5,540,966.

[21] Appl. No.: 660,241

[22] Filed: Jun. 7, 1996

Related U.S. Application Data

[63] Continuation of Ser. No. 286,289, Aug. 5, 1994, Pat. No. 5,540,966.

[51] Int. Cl.$^6$ ............................................. B32B 3/00
[52] U.S. Cl. .................. 428/64.1; 428/64.2; 428/64.4; 428/64.7; 428/913; 430/270.13; 430/272.1; 430/495.1; 430/945; 369/275.3; 369/283; 369/288
[58] Field of Search .................... 428/64.1, 64.2, 428/64.4, 64.7, 913; 430/272.1, 270.1, 270.11, 270.13, 495.1, 945; 369/275.1, 275.3, 283, 288

[56] References Cited

U.S. PATENT DOCUMENTS

| | | |
|---|---|---|
| 3,946,367 | 3/1976 | Wohlmut et al. . |
| 4,219,704 | 8/1980 | Russell . |
| 4,385,372 | 5/1983 | Drexler . |
| 4,450,553 | 5/1984 | Holster et al. . |
| 4,493,887 | 1/1985 | Peeters et al. . |
| 4,735,878 | 4/1988 | Hamersley et al. . |
| 4,905,215 | 2/1990 | Hattori et al. . |
| 5,093,174 | 3/1992 | Suzuki et al. . |
| 5,126,996 | 6/1992 | Iida et al. . |
| 5,134,604 | 7/1992 | Nagashima et al. . |
| 5,171,392 | 12/1992 | Iida et al. . |
| 5,202,875 | 4/1993 | Rosen et al. . |
| 5,238,722 | 8/1993 | Yashiro et al. . |
| 5,255,262 | 10/1993 | Best et al. . |
| 5,303,224 | 4/1994 | Chikuma et al. . |
| 5,303,225 | 4/1994 | Satoh et al. . |

FOREIGN PATENT DOCUMENTS

| | | |
|---|---|---|
| 0 517 490 A2 | 12/1992 | European Pat. Off. . |
| 0 520 619 A1 | 12/1992 | European Pat. Off. . |
| 62-42343 | 2/1987 | Japan . |
| 63-145087 | 6/1988 | Japan . |
| 6-44611 | 2/1994 | Japan . |
| 6-155921 | 6/1994 | Japan . |
| 6-187662 | 7/1994 | Japan . |

OTHER PUBLICATIONS

"IBM Scientists Demonstrate Multilevel Optical Disks; Could Increase Optical Data Capacities 10–Fold or More," IBM Press Release, May 12, 1994.

"New I.B.M. Laser Method Stacks Data on Disks," *N.Y. Times*, May 13, 1994.

Primary Examiner—Elizabeth Evans
Attorney, Agent, or Firm—Eric D. Levinson

[57] ABSTRACT

A dual layer pre-recorded optical disc includes a transparent substrate, a partially reflective layer, a transparent spacer layer, and a highly reflective layer. One pattern of data pits is provided on the substrate, adjacent the partially reflective layer, and another pattern of data pits is provided on the spacer layer, adjacent the highly reflective layer. The partially reflective layer may be made of silicon carbide. A substrate-incident beam can be used to read data encoded in either data pit pattern depending on which layer the laser is focused upon. The dual layer disc has twice the data storage capacity of conventional single layer discs.

38 Claims, 6 Drawing Sheets

DUAL LAYER OPTICAL MEDIUM HAVING PARTIALLY REFLECTING THIN FILM LAYER

This application is a continuation of U.S. application Ser. No. 08/286,289, filed Aug. 5, 1994, now issued as U.S. Pat. No. 5,540,966.

FIELD OF THE INVENTION

The present invention relates generally to the field of optical media, and more specifically to the area of optical media which employ two or more information storage layers.

BACKGROUND OF THE INVENTION

There is a seemingly never-ending demand in the field of data storage for media having increased storage capacity and performance. In the field of pre-recorded optical discs, such as compact discs and video discs, increased storage capacity is usually achieved by increasing the storage density per unit area of the disc. However, the maximum data storage density achievable in an optical recording system is limited by the smallest feature that the optical system can resolve. For conventional far-field imaging systems, the smallest resolvable feature size is limited by diffraction effects to approximately the wavelength of the available light source, usually a solid state laser diode. Thus, one method of increasing disc storage capacity is to decrease the wavelength of the laser diode. However, while the wavelengths available from laser diodes have been steadily decreasing, the decreases have not been dramatic due to limitations in solid state technology and materials.

A number of other techniques for increasing storage capacity of optical recording systems have been proposed. These include: (1) higher efficiency data coding schemes, e.g., pulse-width modulation; (2) optical and/or magnetic super-resolution; (3) zoned recording at constant angular velocity; (4) advanced data channel detection methods, such as partial response/maximum likelihood detection, and (5) recording on both the grooves and land areas of the disc.

While the preceding methods for increasing storage capacity all rely upon increasing the storage density per unit area of the disc, an alternative method for increasing the capacity of an optical disc is to employ additional storage layers on the disc which can be independently recorded or reproduced. Thus, the approach in this case is to increase the addressable area of the disc. This approach is attractive because it has the potential to substantially increase media storage capacity with only a modest increase in media and recording system complexity.

If multiple storage layers, e.g., 2, are to be reproduced by optical beam(s) provided on one side of the disc, then one of the storage layers of the disc must be reflective enough so that it may be reproduced by the optical beam(s), but transparent enough so that the beam(s) may penetrate the first storage layer and pass on to a second storage layer. However, such a disc has proved to be difficult to construct, especially, where only a single laser is employed.

SUMMARY OF THE INVENTION

Accordingly, the present invention provides an optical disc having a partially reflecting layer and a transparent spacer layer that allows a single reproducing optical beam to focus on either of two different planes within the disc. The disc includes a transparent substrate having a pattern of pits in one of its sides. A partially reflective layer adjacent the pit pattern has an index of refraction having a real component (n) between 2.6 and 3.2 and an imaginary component (K) less than 0.4, measured at any wavelength within the range of from 500 to 850 nm. A transparent polymer spacer layer is provided over the partially reflective layer, and a highly reflective layer is provided over the spacer layer.

In one embodiment of the present invention, the substrate comprises polycarbonate and the spacer layer comprises a photopolymer. A second pattern of pits may be provided in the side of the spacer layer adjacent the highly reflective layer. The internal surface reflectivity of the partially reflective layer preferably varies by less than ±0.03 over variations in thickness in the partially reflective layer of ±10%. The spacer layer has a thickness of from about 5 to 100 µm.

In another embodiment of the present invention, the partially reflective layer includes silicon carbide. One preferred ratio of the silicon to the carbon in the partially reflective layer is 1:1.3. In yet another embodiment, the partially reflective layer includes silicon carbide containing from about 5 to 15 atomic % oxygen. The partially reflective layer is preferably 30 to 80 nm thick.

The present invention also includes optical storage systems which include the media described above. The systems further include a focused laser beam positioned to enter the medium through the substrate, means for adjusting the focal position of the laser beam on either the partially reflective or highly reflective layer, and a photodetector positioned to detect the reflected laser beam exiting the medium.

As used herein, the terms "silicon carbide" or "SIC" mean mixtures of silicon and carbon ranging in composition from 30–50 atomic % silicon, 35–60 atomic % carbon, and 0–20 atomic % oxygen, as measured by x-ray photoelectron spectroscopy, and having silicon-carbon stoichiometries ranging from $SIC_{0.9}$ to $SiC_{1.4}$.

DETAILED DESCRIPTION

Figure 1:
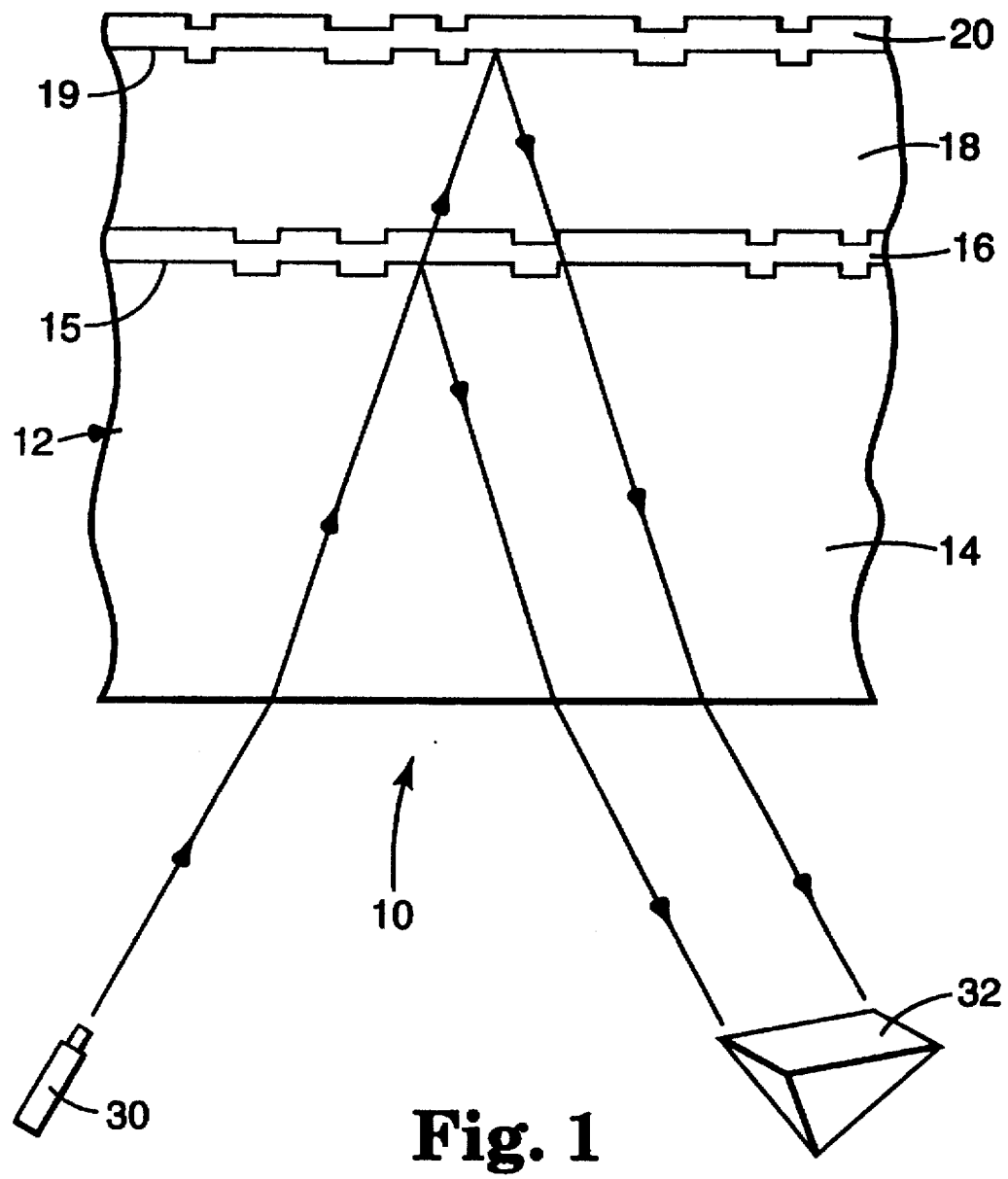
FIG. 1 shows an optical dam storage system according to the present invention.

An optical data storage system 10 according to the present invention is shown in FIG. 1. Optical storage medium 12 comprises a transparent substrate 14, a partially reflective thin film layer 16 on a first data pit pattern 15, a transparent spacer layer 18, and a highly reflective thin film layer 20 on a second data pit pattern 19. An optical laser 30 emits an optical beam toward medium 12, as shown in FIG. 1. Light from the optical beam which is reflected by either thin film layer 16 or 20 is sensed by detector 32, which senses modulations in light intensity based on the presence or absence of a pit in a particular spot on the thin film layers.

Although patterns 15 and 19 are referred to as "data pit patterns," pit patterns 15 and 19 may be any pattern of pits or grooves that is capable of storing information, be it data, servo or tracking information, format information, etc.

The capability for independently reading either the first or second pit pattern 15 or 19 is based on the comparatively limited focal depth characteristic of typical optical disc readout systems. The lenses employed in typical optical recorders/players to form a diffraction limited laser radiation spot on the media storage layer have moderately large (0.4 to 0.6) numerical apertures to improve resolution and increase storage density. Such lenses exhibit focal depths (i.e., the range of focus variation over which the focused spot size remains approximately diffraction limited) of about 2 μm; for large focus variations the size of the illuminated spot grows rapidly. Consequently, if partially reflective thin film layer 16 exhibits adequate transmission and the distance separating the two data pit patterns 15 and 19 is large relative to the optical system focal depth, it is possible to focus the laser 30 on either data pit pattern with acceptably low "cross-talk" from the other data pit pattern. Thus, although the light from laser 30 will be reflected back toward detector 32 by both layers 16 and 20, only the layer upon which the laser is focused will strongly modulate the reflected light intensity, thereby enabling data readout.

The data pit patterns 15 and 19 on medium 10 can be reproduced most easily by first focusing on one of the reflective layers 16 or 20, and then reproducing the data on that entire layer before switching focal position to focus on the other reflective layer. In the alternative, it may be desirable to switch focus position one or more times before completely reproducing the data contained in one of data pit patterns 15 and 19. In either case, use of two data pit patterns separated by transparent layer 18 effectively doubles the data storage capacity of optical recording medium 10.

Transparent substrate 14 may be a polymeric material suitable for optical disc substrates which supports molding of data pit pattern 15 with sufficient fidelity, such as polycarbonate or amorphous polyolefin. Alternatively, it is possible to use a flat substrate of, for example, glass or polymethylmethacrylate, and form data pit pattern 15 by means of photopolymer replication, as will be described for the formation of data pit pattern 19.

Transparent spacer layer 18 may be a polymer, such as a photocurable polymer, which has a complex refractive index with a real component, n, ranging from about 1.45 to 1.6 and an imaginary component, K, of less than $10^{-4}$ and more preferably less than $10^{-5}$. Transparent spacer layer 18 should be thick enough to allow laser 30 to focus on either of data pit patterns 15 and 19 with a minimum of cross-talk. This translates into a thickness that is preferably within the range of from about 5 to 100 μm, and more preferably from about 30 to 50 μm.

Highly reflective layer 20 may be a metallic layer which exhibits high reflectivity at the laser wavelength used to reproduce the data. Currently available laser diode sources radiate at wavelengths ranging from about 600 to 850 nm. Aluminum, gold, silver, copper and their alloys can exhibit suitably high reflectivity in this wavelength range. Highly reflective layer 20 preferably has a reflectance of at least 70%, and more preferably at least 80%.

In order to minimize the complexity and cost of optical data storage system 10, it is desirable that the average readout signal levels from each of the data pit patterns 15 and 19 be approximately equal. Thus, the apparent reflectivities from layers 16 and 20, as seen by detector 32, should also be approximately equal.

As used herein, the term "apparent reflectivity" refers to the fraction of optical power incident upon transparent substrate 14 which, when focused to a spot on a flat region of either layer 16 or 20, could, in principle, be sensed by a photodetector in an optical readout device. It is assumed that the readout device comprises a laser, an appropriately designed optical path, and a photodetector. It is further assumed that the optical element in the optical path which is in closest proximity to transparent substrate 14 is a high (>0.4) numerical aperture objective lens. As used herein, the terms "internal surface reflectivity" or "internal interface reflectivity" refer to the fraction of optical power incident upon an interface within the media structure (e.g., the interface between transparent substrate 14 and partially reflecting layer 16 or the interface between spacer layer 18 and highly reflecting layer 20) which is reflected.

In order to estimate the necessary reflectivity from partially reflective layer 16, we assume that highly reflective layer 20 consists of aluminum, which reflects about 80 to 85% of the light incident on the internal interface between spacer layer 18 and highly reflective layer 20. It is further assumed that the refractive index real component, n, of spacer layer 18 is 1.5, that substrate 14 is polycarbonate with a refractive index real component, n, of 1.57, and that reflections at the air-substrate interface do not contribute to the readout signal. If we further assume that partially reflecting layer 16 is an ideal material which exhibits no absorption, it can be shown that a reflectivity of about 0.35, as observed at the internal interface between substrate 14 and the partially reflecting layer will yield a balance in the apparent reflectivities from layers 16 and 20. While a partially reflecting layer 16 which exhibits no absorption is ideal, real partially reflecting layer materials are likely to exhibit some absorption. If we choose a hypothetical partially reflective layer which absorbs 25% of the light it does not reflect and define this as an upper limit for acceptable absorption, we find that an internal surface reflectivity of about 0.25 is required to balance the reflectivity of layers 16 and 20. In this case, the apparent reflectivities from both layers is about 30% less than for the case of a partially reflecting layer which exhibits no absorption. Thus, the preceding examples define a range for the internal surface reflectivity at the interface between the substrate 14 and layer 16 of from about 0.25 to 0.35. Taking into account the attenuation due to reflections at the substrate-air interface, the above range corresponds to an apparent reflectivity seen by an optical readout device of about 0.24 to 0.33.

Figure 2:
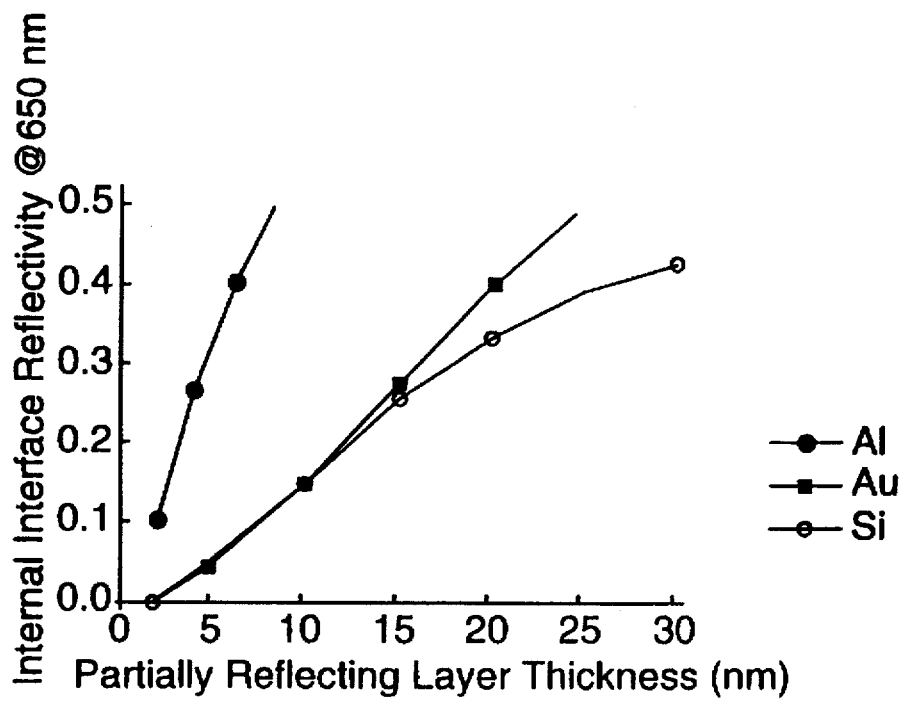
FIG. 2 is a computer-generated graph of internal interface reflectivity at 650 nm as a function of thickness for various materials.

Candidate materials for partially reflecting layer 16 include metals, semiconductors and dielectrics. Metals, however, are generally strongly absorbing and may be expected to cause excessive signal attenuation. Furthermore, the reflectivity of metallic films typically is a very strong function of film thickness. FIG. 2 is a computer-generated graph based on optical modeling showing internal surface reflectivity for incident light of wavelength 650 nm as a function of thickness calculated for films of gold (Au), aluminum (Al), and silicon (Si) films sandwiched between a 1.2 mm thick polycarbonate substrate and a slab of n=1.5, K=0 material, which approximates the effect of transparent spacer layer 18.

Examination of FIG. 2 reveals that the reflectivity of an Al or Au partially reflecting layer changes very rapidly with thickness, making control of film thickness and uniformity during manufacture very difficult. An amorphous layer of the semiconductor Si exhibits behavior which is similar to that of Au over the desired reflectivity range of 0.24 to 0.33; i.e., small changes in film thickness result in substantial changes in reflectivity. Furthermore, films with reflectivities in the desired 0.24 to 0.33 range would be only about 4 nm thick for Al and about 15–20 nm thick for Au and Si. Such relatively thin films may exhibit poor environmental stability.

Figure 3:
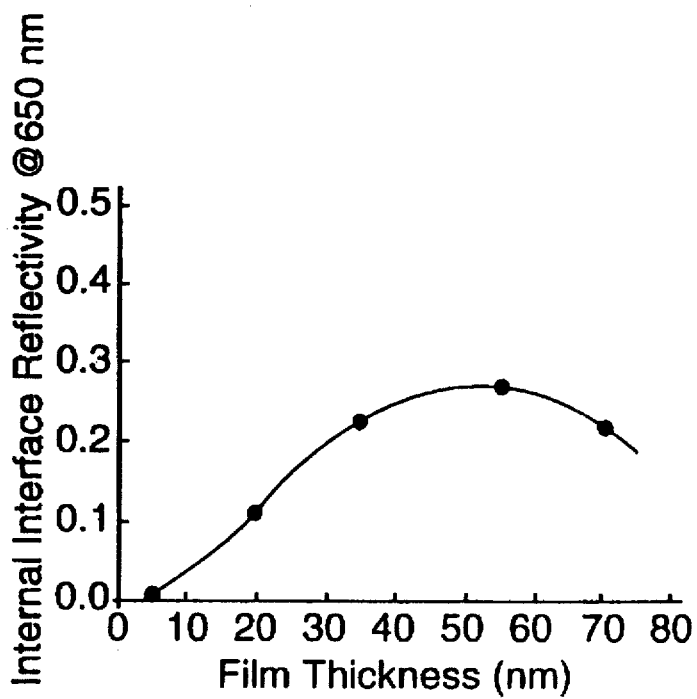
FIG. 3 is a computer-generated graph of internal surface reflectivity at 650 nm as a function of thickness for silicon carbide according to the present invention.

In contrast to the behavior depicted in FIG. 2, I have found that a partially reflective film comprising amorphous silicon carbide exhibits reflectivity vs. thickness behavior which is much more desirable. As shown in FIG. 3, which is a computer-generated graph based on optical modeling, the internal surface reflectivity at 650 nm lies within the desirable range of from about 024 to 0.33 for amorphous silicon carbide film thicknesses ranging from about 35 nm to 65 nm. Small changes in thickness within this range have a much less pronounced effect on reflectivity than is observed for the materials depicted in FIG. 2. Consequently, the manufacturability of a dual layer disc comprising a silicon carbide partially reflecting layer is greatly improved relative to that of a dual layer disc comprising partially reflecting layers with characteristics such as those depicted in FIG. 2.

The complex refractive index used to generate the graph shown in FIG. 3 was determined for an amorphous silicon carbide film having approximately 42 atomic % silicon, 53 atomic % carbon, and 5 atomic % oxygen, as measured by x-ray photoelectron spectroscopy. The highly desirable behavior shown in FIG. 3 results from the complex refractive index characteristic of amorphous silicon carbide. The relatively low value of K ($\approx 0.19$ at 650 nm) results in acceptably low attenuation of the signal from second data pit pattern 20, and in combination with the relatively large value of n ($\approx 3.07$ at 650 nm), yields a first maximum in reflectivity as a function of thickness that lies within the desired range for the FIG. 1 media construction. The small rate of change in reflectance versus thickness on either side of the maximum yields the highly desired insensitivity of the reflectance to variations in the thickness of partially reflecting layer 16.

As noted previously, in addition to having a partially reflective layer for which reflectance changes only slowly with thickness variations, it is also desirable that the apparent reflectivities from layers 16 and 20 be approximately equal, and it is most desirable that both characteristics occur over the same range of partially reflecting layer thicknesses. Stated differently, it is most desirable to have a media construction for which the apparent reflectivities from layers 16 and 20 are both substantially equal and insensitive to layer 16 thickness variations. This situation is depicted schematically in a computer-generated graph based on optical modeling shown in FIG. 4. Inspection of FIG. 4 reveals that the apparent reflectivities from layers 16 and 20 differ from one another by less than about ±0.03 for partially reflecting layer thicknesses ranging from about 50 to about 80 nm, i.e., a thickness variation from a nominal value of 65 nm of more than ±20%. It can be shown that the absolute values of apparent reflectivity for both layers 16 and 20 depend upon both the real and imaginary components of the partially reflecting layer complex refractive index, and that the behavior shown in FIG. 4 occurs for only a narrow range of complex refractive index values.

Figure 4:
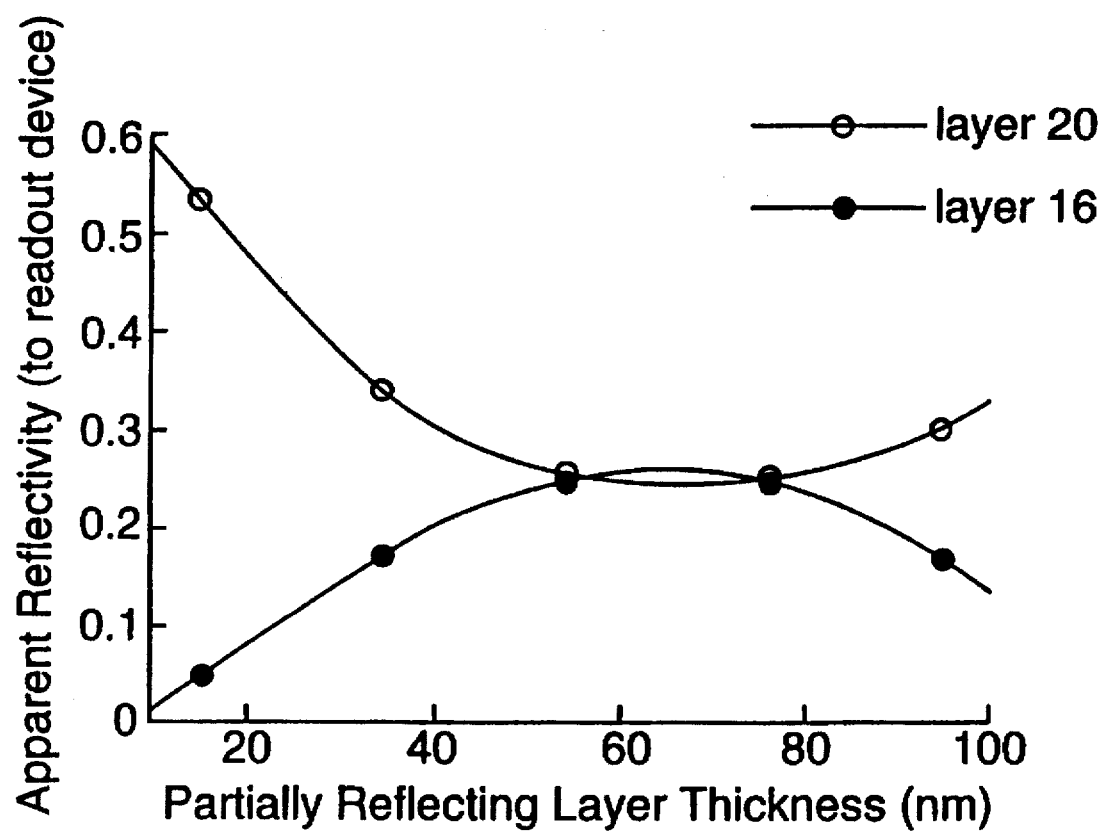
FIG. 4 is a computer-generated graph of apparent reflectivity at 780 nm as a function of thickness for silicon carbide according to the present invention.

Using the previously described assumptions regarding the reflectance of the highly reflective layer and the optical properties of the substrate 14 and photopolymer layer 18, it can be shown that a SiC partially reflective layer (similar in composition to the film used in FIG. 3) will exhibit behavior substantially identical to that depicted in FIG. 4 when used at a wavelength of 780 nm, i.e., the wavelength used by currently available compact disc players. Amorphous silicon carbide, thus, is close to an ideal material for use at this wavelength. However, K varies as a function of wavelength. Use of amorphous silicon carbide containing no more than 5 atomic % oxygen at wavelengths in the 600–650 nm range is somewhat less ideal, however, as K has increased from about 0.12 at 780 nm to about 0.24 at 600 nm.

The approximate doubling of K results in less light transmission through partially reflecting layer 16, which reduces the apparent reflectivity from highly reflecting layer 20. Consequently, the apparent reflectivities from layers 16 and 20 will not be substantially equal over the desired range of partially reflecting layer thicknesses. Accordingly, it may be desirable to alter the physical properties of the SiC to reduce K. This may be accomplished by the use of a dopant, such as silicon dioxide.

Figure 5:
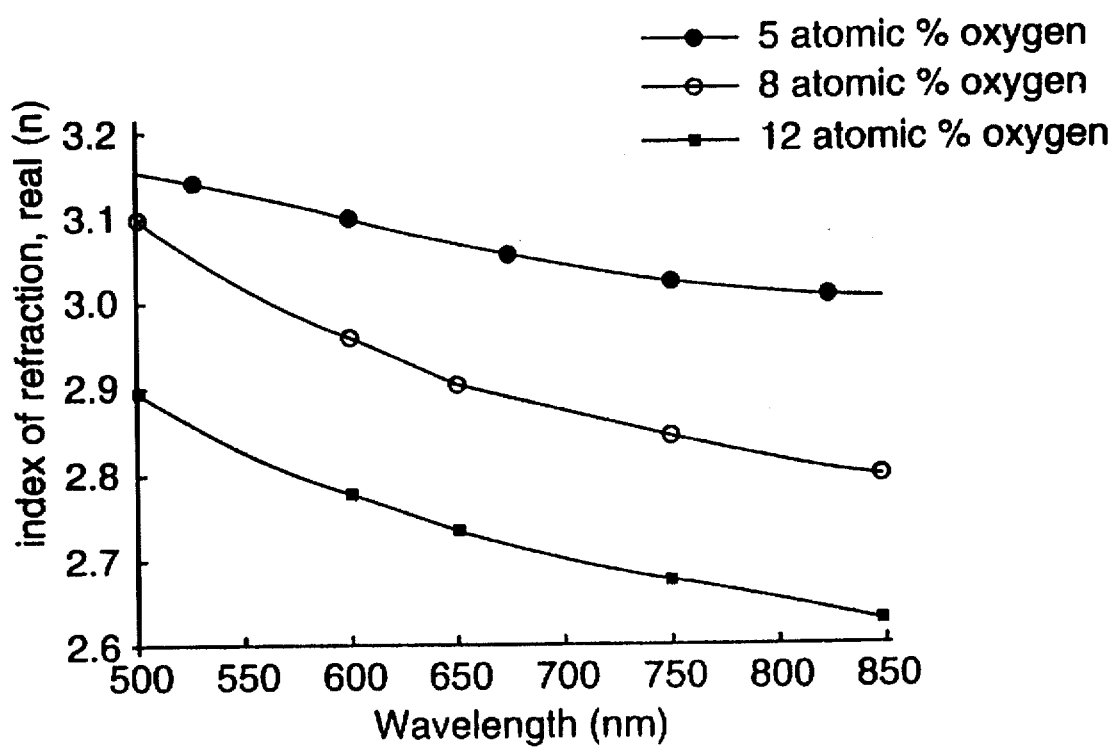
FIG. 5 is a graph of the real component of the index of refraction (n) as a function of wavelength for various materials according to the present invention.
Figure 6:
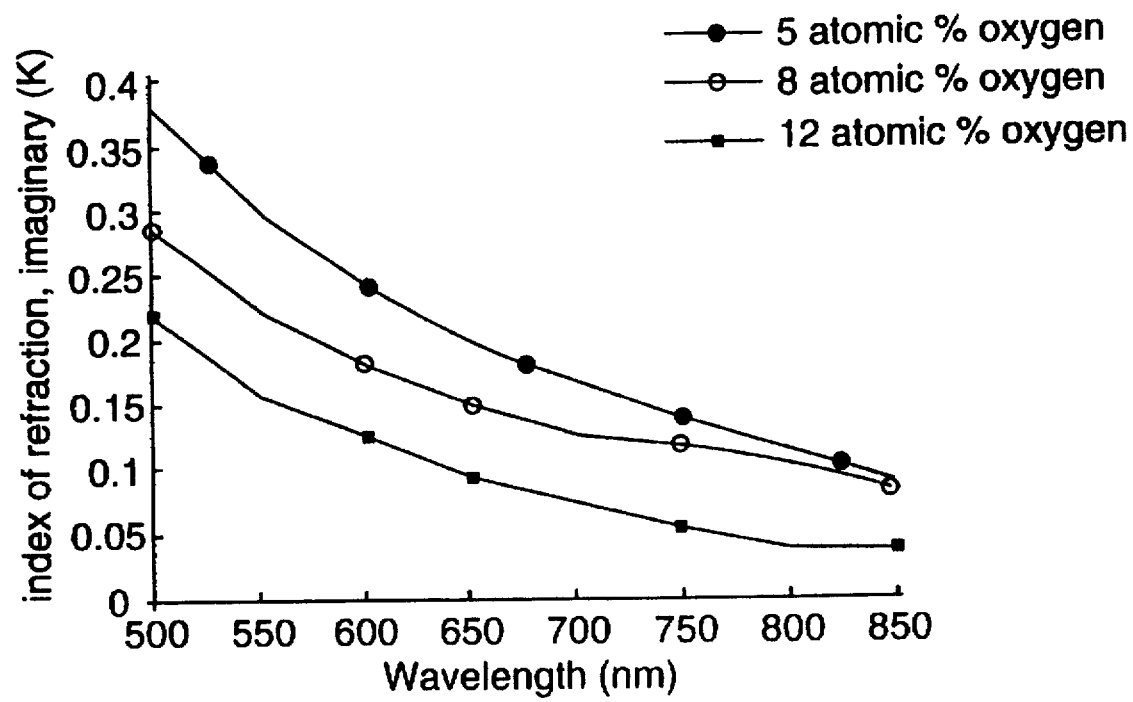
FIG. 6 is a graph of the imaginary component of the index of refraction (K) as a function of wavelength for various materials according to the present invention.

The real and imaginary components of complex refractive index for three different amorphous silicon carbide compositions are shown in FIGS. 5 and 6 as a function of wavelength. These three specimens were prepared by cosputtering from a silicon carbide target and a silicon dioxide target and changing the power levels, resulting in three different amorphous silicon carbide compositions. The first composition contained about 42 atomic % silicon, 53 atomic % carbon, and 5 atomic % oxygen. The second and third amorphous silicon carbide compositions contained about 8 and 12 atomic % oxygen respectively. As shown in FIGS. 5 and 6, the complex refractive index of these materials varies with wavelength.

FIGS. 5 and 6 show that addition of oxygen to the amorphous SiC reduces both n and K of the resulting mixture. As the reduction in n will decrease the magnitude of the maximum reflectivity from the internal interface between substrate 14 and layer 16 while the reduction in K manifests itself as increased transmission of light through layer 16, it is apparent that relatively small additions of oxygen into SiC can be used to tune the optical properties of the resulting mixture such that the highly desirable behavior schematically depicted in FIG. 4 can be obtained for substantially any wavelength for which media operation is desired within the 500 to 850 nm wavelength range.

Those skilled in the art will appreciate that medium 12 of the present invention is not restricted to pre-recorded media. For example, second data pit pattern 19 could be replaced with a grooved or pitted pattern which provides tracking information to the drive. If a highly reflective, recordable material were used for highly reflective thin film layer 20, medium 12 could contain pre-recorded information in first data pit pattern 15 while allowing data to be recorded by the user into layer 20. Thus, in this case, medium 12 would have one layer of pre-recorded data and one layer of user recordable information.

The present invention will now be further illustrated by the following nonlimiting examples. (All measurements are approximate.)

EXAMPLE 1

A medium 10 as shown in FIG. 1 was constructed as follows. A nominally 1.2 mm thick polycarbonate substrate 14 having a data pit pattern 15 was injection molded. Substrate 14 was placed under vacuum for at least 8 hours to remove absorbed water. Amorphous silicon carbide was used for the partially reflective layer 16. The silicon carbide was sputter deposited from a silicon carbide target onto data pit pattern 15 on substrate 14 using an inner diameter (ID) and outer diameter (OD) mask.

The disc was then placed i a spin coater. Transparent spacer layer 18 was deposited by dispersing via syringe about 1 ml of UV curable photopolymer having a nominal viscosity of 1350 centipoise in a "donut" configuration near the disc ID while the disc was rotating at about 50 revolutions/minute (rpm). The rotational speed of the disc was then quickly (i.e., in less than one second), ramped up to 3000 rpm for at least 10 seconds.

The disc was then removed from the spin coater using a vacuum wand and was positioned on a replicator platen. The disc was covered with an inert atmosphere (nitrogen) and was cured using ultraviolet (UV) radiation from a medium pressure mercury arc lamp.

A second photopolymer layer was deposited and cured on the previous layer in the same manner described above to create a nominal photopolymer spacer layer 18 of 34–37 μm between the data pit pattern molded into the substrate and the subsequently deposited photopolymer layer into which the second data pit pattern was replicated.

Second data pit pattern 19 was formed by first depositing a third photopolymer layer as described above, but without performing the UV cure step. A stamper containing a negative of the second data pit pattern was brought into contact with the uncured photopolymer. The third polymer was then UV cured and the stamper carefully removed. The disc was then subjected to a post-UV cure.

The disc was then placed under vacuum for at least 8 hours to remove absorbed water and other vacuum contaminants. Using an ID mask, highly reflective layer 20 comprising about 97 atomic % aluminum was vacuum deposited to a thickness of about 100 nm.

A photocurable sealcoat was then deposited over highly reflective layer 20 to protect it, and was UV cured as described above. As a final step, the disc was finished by abrasive polishing around its outer circumference to remove any excess photopolymer from the spin coating and replication processes. The abrasive finishing step was accomplished by holding the disc in a center-hole chuck, rotating it at about 500 to 1000 rpm, and gently holding the edge against sandpaper attached to a firm surface.

EXAMPLE 2

Figure 7A:
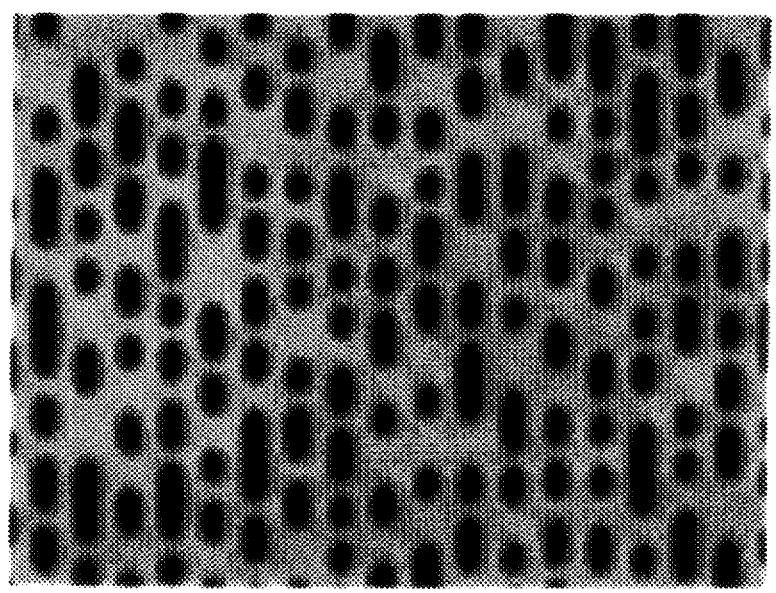
FIGS. 7A–7C show photomicrographs of various layers of the optical recording medium constructed according to Example 1.
Figure 7B:
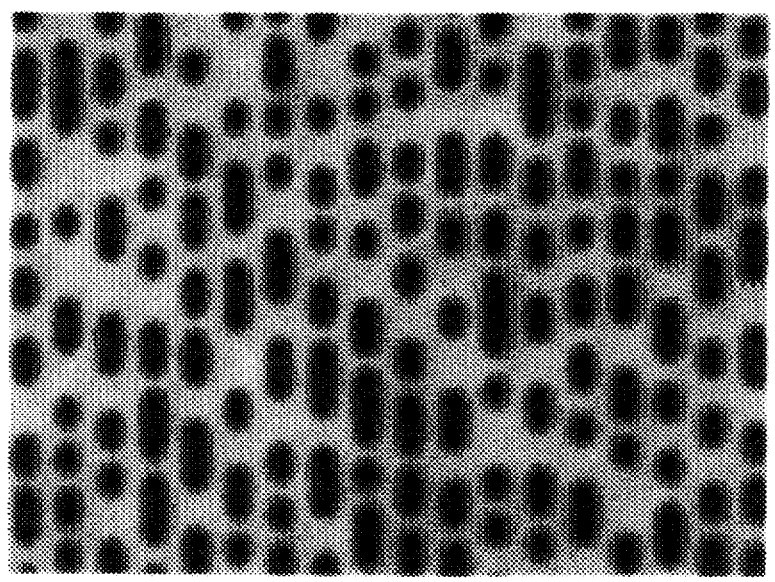
Figure 7C:
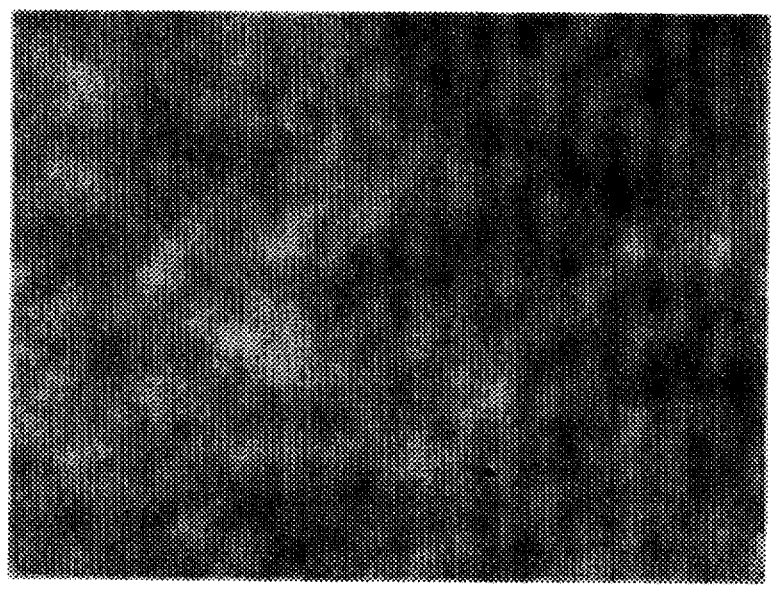

Discs made in the manner described above were then placed in a Nikon model UM-2 measuring microscope. Photomicrographs of the two reflective layers are shown in FIGS. 7A and 7B. FIG. 7A shows data pit pattern 15 for partially reflective layer 16. FIG. 7B shows data pit pattern 19 for highly reflective layer 20. Note that even though light from the microscope must pass through partially reflective layer 16 to reach highly reflective layer 20 (and then must pass back through layer 16 upon reflection from layer 20), the microscope was still able to focus on highly reflective layer 20. The photomicrographs shown in FIGS. 7A and 7B show good contrast between land and pit regions, which would be expected to lead to adequate read-back signals from a laser focused on either layer. FIG. 7C is a photomicrograph taken where the microscope was focused at a point midway between reflective layers 16 and 20. The photomicrographs demonstrate that it is possible for a drive to focus on and distinguish between the two data pit patterns.

I claim:

1. An optical storage medium, comprising, in order:
   a transparent substrate having a pattern of pits or grooves in one major surface thereof;
   a partially reflective layer adjacent the pattern, having an index of refraction having a real component, n, wherein $2.6 < n < 3.2$, and an imaginary component, K, wherein $K < 0.4$, measured over a range of wavelengths from 500 to 850 nm;
   a transparent polymer spacer layer having a thickness within the range of from about 5 to 100 μm; and
   a highly reflective layer.

2. The medium of claim 1, wherein the pattern represents pre-recorded information.

3. The medium of claim 1, wherein the highly reflective layer comprises a recordable material, whereby data may be recorded on the highly reflective layer by a user.

4. The medium of claim 1, wherein the pattern contains pre-recorded data and the highly reflective layer comprises a recordable material, whereby data may be recorded on the highly reflective layer by a user.

5. The medium of claim 1, wherein the partially reflective layer has an internal surface reflectivity which varies by less than ±0.03 over thickness variations in the partially reflective layer of ±10%.

6. An optical storage system, comprising:
   an optical storage medium, comprising, in order:
      a transparent substrate having a pattern of pits or grooves in one major surface thereof;
      a partially reflective layer adjacent the pattern, having an index of refraction having a real component, n, wherein $2.6 < n < 3.2$, and an imaginary component, K, wherein $K < 0.4$, measured over a range of wavelengths from 500 to 850 nm;
      a transparent polymer spacer layer having a thickness within the range from about 5 to 100 μm; and
      a highly reflective layer;
   a focused laser beam positioned to enter the medium through the substrate;
   means for adjusting focal position of the laser beam, whereby the beam may be focused on either the partially reflective layer or the highly reflective layer; and
   a photodetector positioned to detect the reflected laser beam exiting the medium.

7. The medium of claim 6, wherein the pattern contains pre-recorded data and the highly reflective layer comprises a recordable material, whereby data may be recorded on the highly reflective layer by a user.

8. An optical storage medium, comprising, in order:
   a transparent substrate having a pattern of pits or grooves in one major surface thereof;
   a partially reflective layer adjacent the pit pattern, having an index of refraction having a real component, n, wherein $2.6 < n < 3.2$, and an imaginary component, K, wherein $K < 0.4$, measured at a wavelength of 650 nm;
   a transparent polymer spacer layer having a thickness within the range from about 5 to 100 μm; and
   a highly reflective layer.

9. The medium of claim 8, wherein the pattern represents pre-recorded information.

10. The medium of claim 8, wherein the highly reflective layer comprises a recordable material, whereby data may be recorded on the highly reflective layer by a user.

11. The medium of claim 8, wherein the pattern contains pre-recorded data and the highly reflective layer comprises a recordable material, whereby data may be recorded on the highly reflective layer by a user.

12. The medium of claim 8, wherein the transparent substrate comprises polycarbonate and the spacer layer comprises a photopolymer.

13. The medium of claim 8, wherein the partially reflective layer has an internal surface reflectivity which varies by less than ±0.03 over thickness variations in the partially reflective layer of ±10%.

14. The medium of claim 8, wherein 2.7<n<3.1.

15. The medium of claim 14, wherein K<0.2.

16. The medium of claim 14, wherein 0.1<K<0.2.

17. An optical storage system, comprising:
an optical storage medium, comprising, in order:
  a transparent substrate having a pattern of pits or grooves in one major surface thereof,
  a partially reflective layer adjacent the pattern, having an index of refraction having a real component, n, wherein 2.6<n<3.2, and an imaginary component, K, wherein K<0.4, measured at a wavelength of 650 nm;
  a transparent polymer spacer layer having a thickness within the range from about 5 to 100 μm; and
  a highly reflective layer;
a focused laser beam positioned to enter the medium through the substrate;
means for adjusting focal position of the laser beam, whereby the beam may be focused on either the partially reflective layer or the highly reflective layer; and
a photodetector positioned to detect the reflected laser beam exiting the medium.

18. The medium of claim 17, wherein the highly reflective layer comprises a recordable material, whereby data may be recorded on the highly reflective layer by a user.

19. The system of claim 17, wherein the transparent substrate comprises polycarbonate and the spacer layer comprises a photopolymer.

20. The system of claim 17, wherein the partially reflective layer has an internal surface reflectivity which varies by less than ±0.03 over thickness variations in the partially reflective layer of ±10%.

21. The system of claim 17, wherein 2.7<n<3.1.

22. The system of claim 21, wherein K<0.2.

23. The system of claim 21, wherein 0.1<K<0.2.

24. An optical storage medium, comprising, in order:
a transparent substrate having a pattern of pits or grooves in one major surface thereof,
a partially reflective layer, adjacent the pattern, comprising silicon carbide;
a transparent polymer spacer layer; and
a highly reflective layer.

25. The medium of claim 24, wherein the pattern represents pre-recorded information.

26. The medium of claim 24, wherein the highly reflective layer comprises a recordable material, whereby data may be recorded on the highly reflective layer by a user.

27. The medium of claim 24, wherein the pattern contains pre-recorded data and the highly reflective layer comprises a recordable material, whereby data may be recorded on the highly reflective layer by a user.

28. The medium of claim 24, wherein the transparent substrate comprises polycarbonate and the spacer layer comprises a photopolymer.

29. The medium of claim 24, wherein the partially reflective layer has an internal surface reflectivity which varies by less than ±0.03 over thickness variations in the partially reflective layer of ±10%.

30. The medium of claim 24, wherein the silicon carbide comprises from about 5 to 15 atomic % oxygen.

31. The medium of claim 30, wherein the silicon carbide is amorphous.

32. The medium of claim 24, wherein the partially reflecting layer is from 30 to 80 nm thick.

33. The medium of claim 24, wherein the ratio of silicon to carbon in the partially reflecting layer is about 1:1.3.

34. The medium of claim 24, wherein the spacer layer has a thickness within the range from about 5 to 100 μm.

35. The system of claim 24, wherein the partially reflecting layer is from 30 to 80 nm thick.

36. The system of claim 24, wherein the spacer layer has a thickness within the range from about 5 to 100 μm.

37. An optical storage system, comprising:
an optical storage medium, comprising, in order:
  a transparent substrate having a pattern of pits or grooves in one major surface thereof;
  a partially reflective layer, adjacent the pattern, comprising silicon carbide;
  a transparent polymer spacer layer; and
  a highly reflective layer;
a focused laser beam positioned to enter the medium through the substrate;
means for adjusting focal position of the laser beam, whereby the beam may be focused on either the partially reflective layer or the highly reflective layer; and
a photodetector positioned to detect the reflected laser beam exiting the medium.

38. The medium of claim 37, wherein the highly reflective layer comprises a recordable material, whereby data may be recorded on the highly reflective layer by a user.

* * * * *